United States Patent
Freill et al.

(10) Patent No.: US 6,414,598 B2
(45) Date of Patent: *Jul. 2, 2002

(54) LIQUID LEAK DETECTOR AND ALARM SYSTEM

(76) Inventors: Michael R. G. Freill, 40 Braelock Ct., Dartmouth, Nova Scotia (CA), B2W 6C8; Peter E. Freill, R.R. #1, Carleton Place, Ontario (CA), K7C 3P1

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/736,783

(22) Filed: Dec. 15, 2000

(30) Foreign Application Priority Data

Dec. 16, 1999 (CA) .............................................. 2292901

(51) Int. Cl.[7] .............................................. G08B 21/00
(52) U.S. Cl. ........................ 340/623; 340/539; 340/636; 340/691.1; 340/691.7; 340/693.2; 73/308
(58) Field of Search ................................ 340/539, 618, 340/623, 624, 625, 636, 691.1, 691.7, 693.2; 73/308

(56) References Cited

U.S. PATENT DOCUMENTS

| | | | | |
|---|---|---|---|---|
| 4,369,438 A | * | 1/1983 | Wilhelmi .................... 340/623 |
| 4,814,752 A | * | 3/1989 | Lehman ....................... 340/623 |
| 4,972,181 A | * | 11/1990 | Fiene .......................... 340/636 |
| 5,006,834 A | * | 4/1991 | Fountain ...................... 340/623 |
| 5,240,022 A | * | 8/1993 | Franklin ...................... 340/605 |
| 5,539,383 A | * | 7/1996 | Chin .......................... 340/604 |
| 5,655,561 A | * | 8/1997 | Wendel et al. .............. 340/605 |
| 6,035,699 A | * | 3/2000 | Parlante ...................... 340/623 |

* cited by examiner

*Primary Examiner*—Daniel J. Wu
(74) *Attorney, Agent, or Firm*—R. Craig Armstrong; Borden Ladner Gervais LLP

(57) ABSTRACT

The alarm system is capable of detecting both conductive and non-conductive liquid level increases, designed for indoor operation, and ideally suited for detecting basement flooding or leaky domestic steel oil tanks or other fluid containment devices. A float, positioned above any surface such as a contained area (sump or drip pan), rises with the presence of a liquid, allowing a spring-loaded switch to rise, triggering a 9-volt powered battery electric circuit. The electric circuit, enclosed in a plastic enclosure, activates an audible pulsating alarm when triggered. A battery voltage monitor incorporated in the electric circuit, tests the battery voltage on a continuous bases, and will trigger the unit into the alarm mode when the battery voltage is insufficient to sustain continuous operation. A simple convenient self check feature allows the user to simply check the unit at any time. An external connection is provided to allow the unit to be connected to a home security system or other external device to allow extended protection or secondary operations.

6 Claims, 5 Drawing Sheets

LIQUID LEAK DETECTOR AND ALARM SYSTEM

BACKGROUND OF THE INVENTION

1. Field of the Invention

The present invention relates to a liquid detection and alarm system for detecting the presence of oil or water leaks from indoor domestic appliances or domestic furnace oil tanks, for example, or for basement flooding. The invention may also be used for industrial applications where the detection of leaking liquids are desirable to prevent environmental or other unwanted results. The invention is typically placed over a drip pan or low point of a surface where the liquid is likely to collect. The invention uses an electrical circuit with an audible alarm device, enclosed in housing, with an attached float.

Oil leaks from domestic 909 liter steel oil tanks or connections can cause serious damage to a home and create an environmental disaster if the oil finds its way under the building foundation. In most cases the oil must be reclaimed from the soil at a considerable expense. If the ground water becomes contaminated, cost for the clean up is higher, and in most cases the property is devalued. There is no accurate prediction device or method, which will determine with accuracy when a tank will fail, or when fittings will leak. There is therefore a need for an alarm system which will be reliable, compact, and will warn the residents that their oil tank is leaking.

The invention will operate for liquids with a density greater then 775 $kg/m^3$ and a flash point no less then 38 degrees Celsius. Typical heating oil found in domestic steel tanks would meet or exceed these minimum limitations.

2. Description of the Prior Art

Prior art includes an Oil Alert system designed by Dorlen Products Inc. of Milwaukee, U.S.A., which features "Oil Alert Sensing Modules" which are absorbing cells which after insertion into a housing, are placed on the floor and will activate an audible alarm after the cells have detected oil. This prior art has limitations, which the invention will overcome. For example, this prior art requires cell replacement after triggering and cannot be easily self checked. The unit must be placed on a level surface, thus cannot act as an adjustable level alarm.

There are other oil detection systems used in industrial applications such as detecting a liquid level between double-wall storage tanks. However, this prior art is intended to be used in this specific industrial application. These known devices do not have an easy self-check mechanism, are not portable, and are typically not equipped with an audible alarm.

Other water detection alarm systems use a conducting sensing method which cannot be used to detect the presence of oil due the fact that oil is a poor electrical conductor.

The invention may be distinguished from the other prior water detection alarms in significant respect. Prior art includes a variety of patents pertaining to water leak detection devices which are designed to detect water and automatically shut down an appliance or valve. Many prior art devices use conductivity sensing probes, strips or cells to detect the presence of water from a leaking basement, appliance, or back-up pipe. An audible alarm will sound when moisture is detected. Representatives of this prior art are patents such as:

Canadian patent no. 1261940 Otterhof
Canadian patent no. 2124907 Janesky
Canadian patent no. 1244533 Leblanc
Canadian patent no. 2023376 Shih
Canadian patent no. 2228517 Isaacson
Canadian patent no. 2175005 Leger
U.S. Pat. No. 5,539,383 Chin
U.S. Pat. No. 5,058,421 Alexander
U.S. Pat. No. 5,091,715 Murphy
U.S. Pat. No. 4,297,686 Tom
U.S. Pat. No. 5,898,374 Schepka
U.S. Pat. No. 5,655,561 Wendal
U.S. Pat. No. 5,557,263 Fisher
U.S. Pat. No. 5,550,532 Marshall
U.S. Pat. No. 4,805,662 Moody
U.S. Pat. No. 4,246,575 Purtell
U.S. Pat. No. 5,517,174 Barrows
U.S. Pat. No. 4,800,372 Poteet
U.S. Pat. No. 4,973,947 Tax Other prior art utilizing conductive type detective systems can easily false alarm when condensation forms on the probes. Absorption type units, which sit on the floor, will become submerged if the water level quickly rises, thus damaging the unit and causing it to malfunction. The invention is intended to be mounted directly above the monitoring surface. The float can rest at any desired height above the monitoring surface, however the component housing should be mounted a minimum distance of 7 cm above the float and up to 807 cm directly above the liquid surface. The minimum distance can be lowered if required, although for most application this is not desired. Most prior art devices are fixed units, which are not adjustable once set in place. The length of the conductivity leads limits the range of these prior art devices.

Other prior art devices generally may not incorporate a fail-safe mechanism, in the event the sensing device becomes disabled for any reason. If a dielectric capacitor, or absorbent cell becomes disabled for any reason, then the unit will not indicate a fault in the alarm unit. Some prior art devices do include a battery low voltage-checking device.

SUMMARY OF THE INVENTION

The invention provides a simple water or oil leak detection alarm system which is capable of producing an audible alarm when the liquid level increases above the point at which the unit is set to trigger. The invention would typically be used in a domestic home application for detecting water flooding, or a leaking oil tank installation. The invention can also be adapted for many industrial applications where the presence of a conductive or non-conductive liquid requires alarming. In combination with its audible alarm, connections preferably are provided for external monitoring, such as a home security system or relay controller. The invention uses a float, which can be adjusted to various heights above the area, which requires monitoring. The invention is portable and can be easily moved from one monitoring position to another, or from one liquid service to another. The invention requires a 9-volt battery, which is checked continuously for sufficient voltage. The unit will sound an alarm when insufficient voltage is detected. A 120 volt ac/9-volt dc external supply can also be used to power the invention. The triggering mechanism of the invention requires a positive liquid level increase of approximately 5 mm after contact with the float to activate the alarm. This ensures the unit does not false alarm with the presence of moisture, like many prior art devices. The invention is ideally suited for monitoring oil leaks from domestic furnace tanks, which can leak at any time. By simply attaching the unit on the side of a pan (located under the tank), with hook and pile fastening material (e.g. Velcro (trademark)) or other commonly known fastening means, the unit will be fixed into position ready to detect a leak. The invention has a simple self-check feature. By the touch of a fingertip, the unit can be self checked to ensure all circuits are fully operational. A fail-safe design ensures that in the event the float becomes disabled for any reason, the unit will sound the alarm.

The invention does not require conductive water detection systems for a triggering mechanism. It uses a float, attached to a lever switch, which upon coming in contact with a rising liquid, will cause the lever switch to rise, activating a spring-loaded switching mechanism.

The invention is portable and can be moved from place to place, or it can be used to service different types of liquid applications. Today when areas become flooded, this alarm will enable a homeowner to set the positioning and height so that the house can be vacated when the alarm sounds. This would be a safety feature in areas under threat of potential flooding. The alarm offers portability and flexibility, along with a reliable simple safety check for operability.

As stated, the invention has a simple self check mechanism. A simple motion of raising the lever switch with a finger will allow the unit to be checked for all operational features. Other prior art devices with self-check mechanisms may require submersion in the water or liquid to be self-checked. This would, typically, be messy and difficult to perform.

The invention incorporates a fail-safe feature. Should the sensing device (float) become detached for any reason, the unit will automatically go into alarm mode.

The invention incorporates a low voltage battery monitoring system which will trigger the alarm circuitry should the battery fall below 7.4 volts. The unit will sound an audible alarm for a minimum of 24 hours in this condition, and will also trigger, if equipped, the external monitoring circuitry. The improvement of the 24-hour continuous alarm along with the triggering of the external circuit for low voltage conditions is an improvement over prior art devices. A new 9-volt alkaline battery will last a minimum of 1 year, in a non-triggered operation mode. The unit may also operate continuously with an external 120 volt AC /9 volt DC adapter.

The alarm system is capable of detecting both conductive and non-conductive liquid level increases, designed for indoor operation, and ideally suited for detecting basement flooding or leaky domestic steel oil tanks or other fluid containment devices. A float, positioned above any surface such as a contained area (sump or drip pan), rises with the presence of a liquid, allowing a spring-loaded switch to rise, triggering a 9-volt powered battery electric circuit. The electric circuit, enclosed in a plastic enclosure, activates an audible pulsating alarm when triggered. The alarm system is capable of generating a sound pulsating at the 85 dB level, preferably every 10 seconds. The alarm system is portable, and can be moved from one site to another, or from one service to another. The unit must sit directly above the site to be monitored, with a clear unencumbered path to the float mechanism. The height above the monitored surface where the alarm is placed can vary according to preference, from a minimum of 7 cm to maximum of 807 cm. The adjustment in height can be accomplished by utilizing 6.80 kg (breaking strength ) braided nylon string which can be cut and tied to the desired length. A battery voltage monitor incorporated in the electric circuit, tests the battery voltage on a continuous bases, and will trigger the unit into the alarm mode when the battery voltage is insufficient to sustain continuous operation. A simple convenient self check feature allows the user to simply check the unit at any time. An external connection is provided to allow the unit to be connected to a home security system or other external device to allow extended protection or secondary operations. which continues to alarm at approximately 10 seconds intervals until the alarm system is reset or the battery voltage is insufficient to sustain the alarm performance.

BRIEF DESCRIPTION OF THE DRAWINGS

The invention will now be described in greater detail with reference to the accompanying drawings of the preferred embodiment, by way of example only, in which.

DETAILED DESCRIPTION OF THE INVENTION

Figure 1:
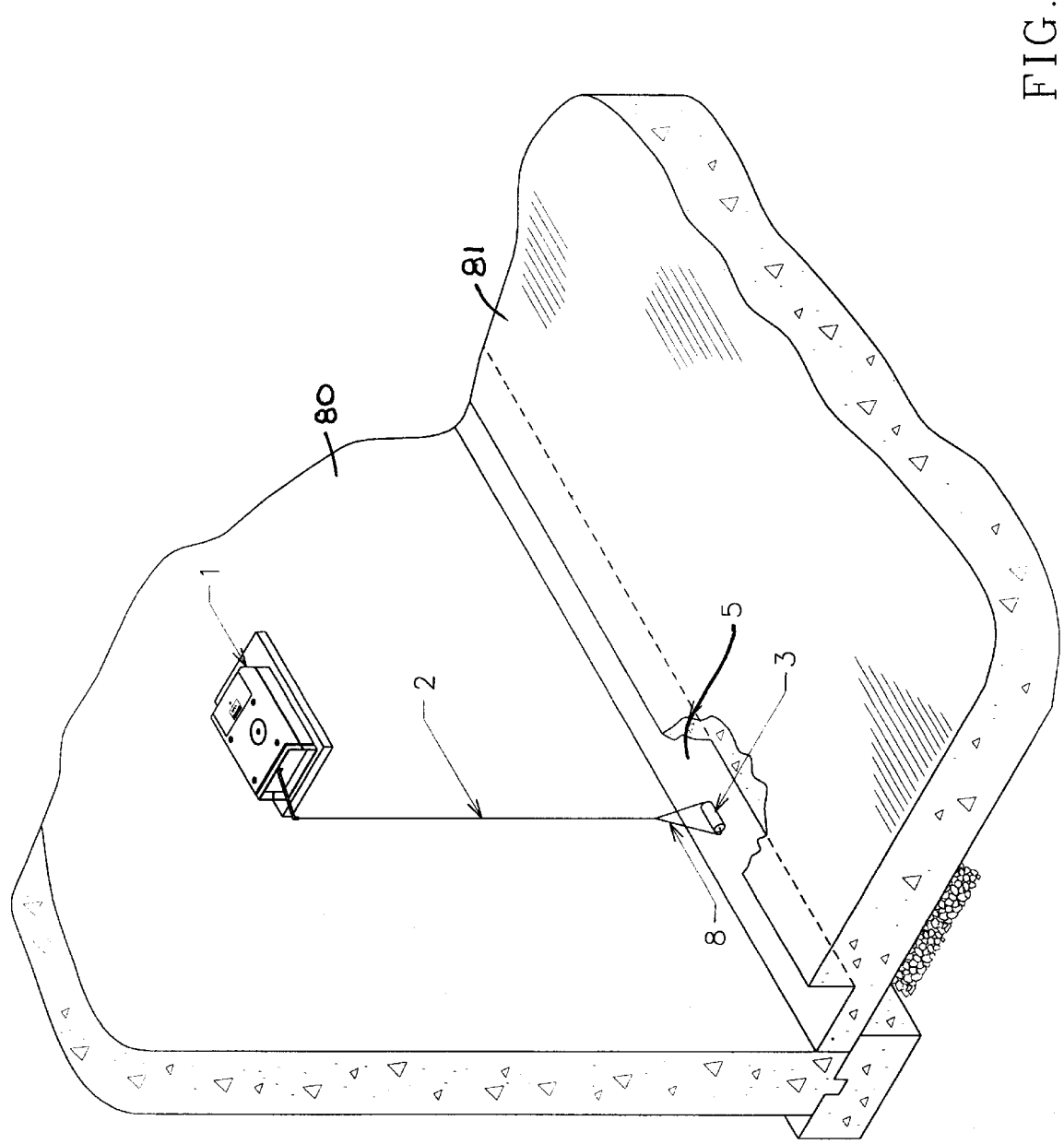
FIG. 1 is a schematic illustration of the leak alarm system mounted off a concrete structure, for monitoring a concrete floor with the invention.

Referring now to FIG. 1, this is a schematic illustration of the leak alarm system mounted off a concrete wall 80 monitoring a concrete floor 81. The housing 1 of the alarm system can be typically mounted using mating Velcro (trademark) surfaces 17 or other commonly known fastening means to ensure the unit remains fixed in place during monitoring. The height above the surface to be monitored can be adjusted using a string 2 (common braided nylon fishing string) and can be adjusted from 7 cm to 807 cm provided the path of the string is not obstructed, and the float 3 is allowed to hang freely. The string is measured, cut and tied to the desired height. The float 3 constructed of cork or other floatable material, has a hole through the center to allow for the triangular metal wire float holder 8 to be inserted into each end. The triangular metal wire float holder 8 which is 7.6 cm in height can be tied with a string in order to locate the alarm unit at the desired height above the monitoring surface. FIG. 1 is a typical application where the unit is monitoring a basement floor or sump area 5.

Figure 2:
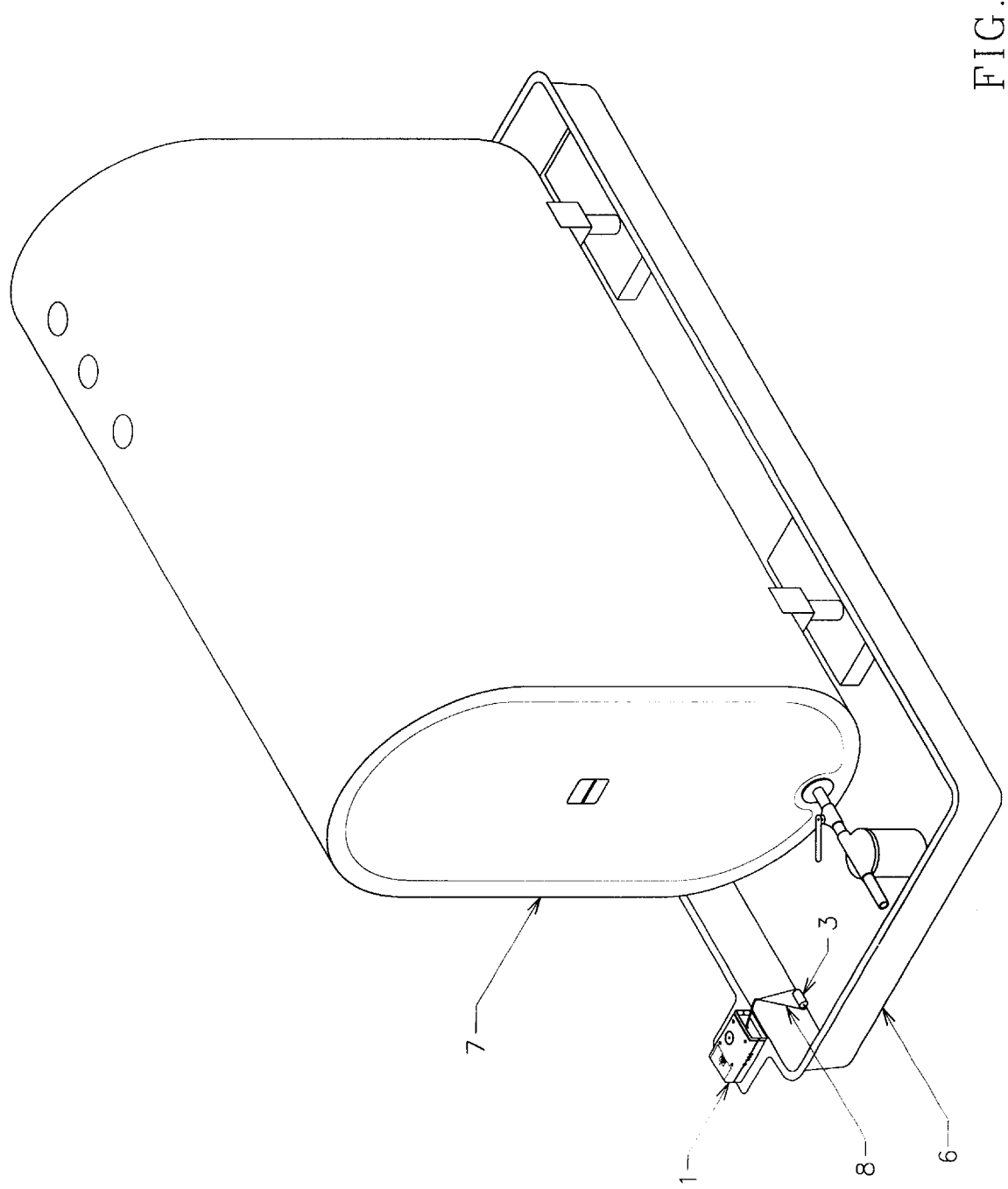
FIG. 2 is a schematic illustration of the leak alarm system mounted on a containment pan monitoring a typical domestic oil tank with the invention.

FIG. 2 is a schematic illustration of the unit mounted on the side of a containment pan 6 monitoring a domestic oil tank 7 installation. The alarm is mounted on the side of the pan, using mating Velcro (trademark) surfaces 17 and utilizing an appropriately sized triangular metal wire 8. The float 3 typically rests 3 mm off the bottom surface of the pan. Should the tank or any of the connections leak allowing the float 3 to rise 4 mm in height, the alarm unit will sound. The alarm can be adapted for use with any size pan containing any liquid provided the specific gravity is above 775 $kg/m^3$. This allows the unit to be used in many domestic or industrial applications where leaks or floods are undesirable and need detecting. The specific gravity of the float mass must be capable of producing a buoyant force when submersed in a 775 kg/m$^3$ liquid.

Figure 3:
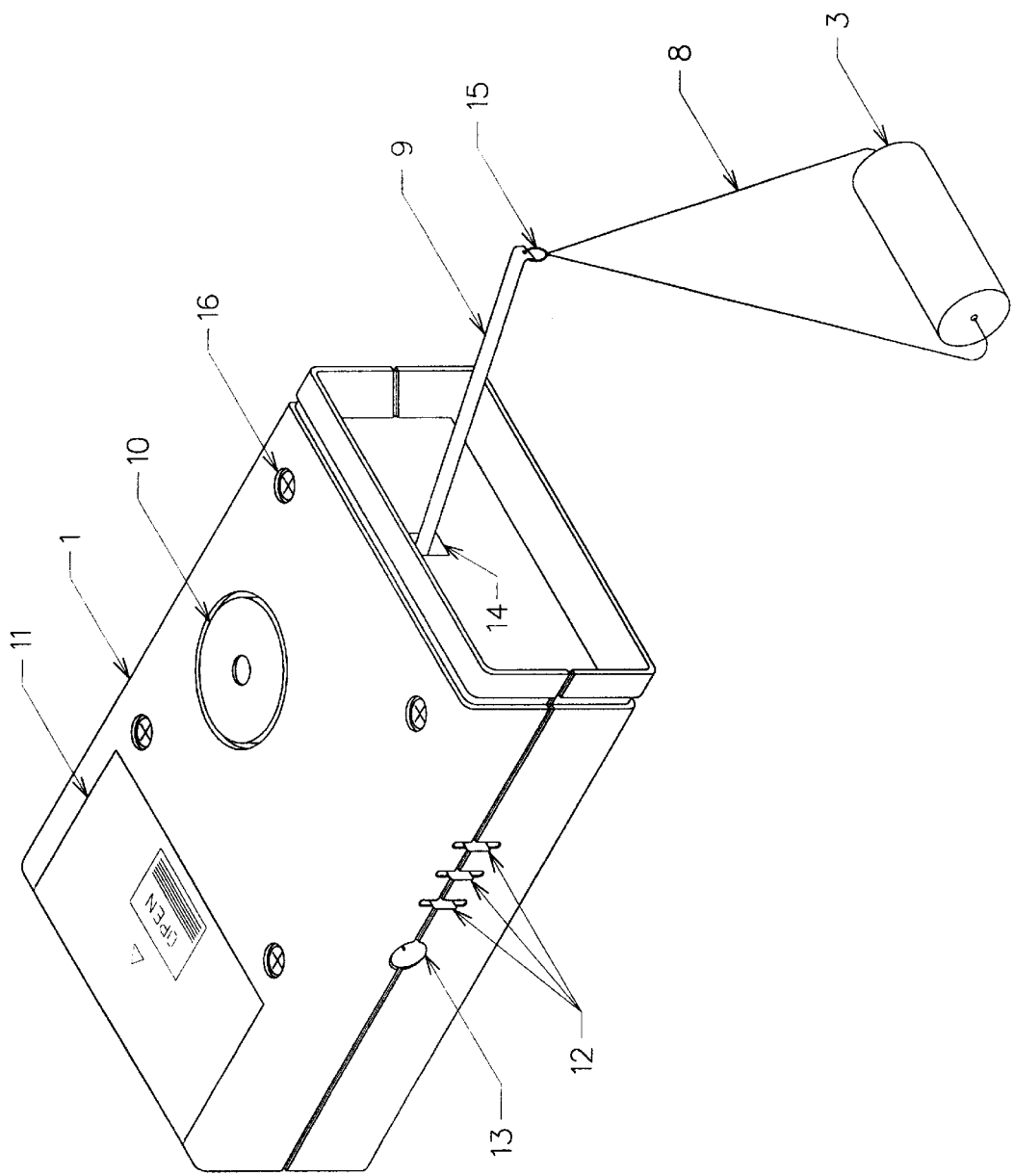
FIG. 3 is perspective view showing the preferred embodiment of the leak alarm system in accordance with the invention.

FIG. 3 is a perspective view showing the preferred embodiment of the invention in greater detail. The housing 1 is constructed of plastic and contains a 9 volt battery compartment 11, an electrical circuit board as shown schematically in FIG. 5, a lever switch 18 (for example Cherry Switch DA3C-H1AA or equivalent), a lever 9, an electrical Piezo 10, external alarming connections 12, and external power supply connection 13. The housing 1 has openings cut or formed to allow the Piezo 10, the lever 9, and the external alarming connections 12 to protrude through housing. The lever 9 is allowed to travel freely in the slot provided on the front housing face 14, which accounts for the full lever operational travel. The housing 1 has an opening to allow for an external power supply connection 13. The lever 9 has a hole 15 located at the outer end to allow the triangular metal wire 8 to be passed through the hole prior to attachment to the float. The hole 15 also acts as the connection point for a braided nylon string should the monitoring height need adjustment. The housing can be separated into two pieces to allow for the insertion of the circuit board FIG. 5. When in monitoring mode, the float 3 hangs down, compressing the lever switch 18, which puts the electrical circuit in battery checking mode. This allows for very little power to be used, which accounts for the long operational life from a 9-volt battery. A 9-volt alkaline battery will last a minimum of 1 year. When the float 3 comes in contact with a liquid of sufficient height to raise the spring loaded lever switch 18, the alarm circuit is activated, causing the external alarm connections 12 to either open or close (depending on external requirements) and the Piezo 10 to emit a beeping sound lasting approximately 1 second at 10 second intervals. The ten-second intervals allows the unit to be differentiated from other domestic type alarms and provide longer battery life. When the battery voltage is below 7.4 volts the alarm circuit also is activated causing the Piezo 10 to emit sounding beeps at 10 second intervals. At this voltage the alarm will sound for a minimum of 24 hours.

Figure 4B:
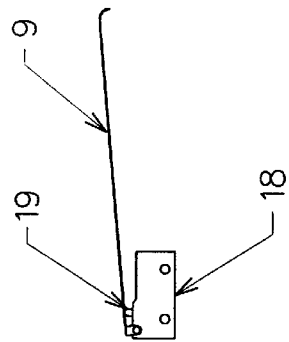
FIG. 4B is a side view of details of the switch and lever.
Figure 4D:
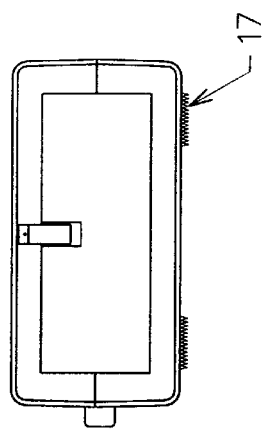
FIG. 4D is a front view of the switch and lever.
Figure 4A:
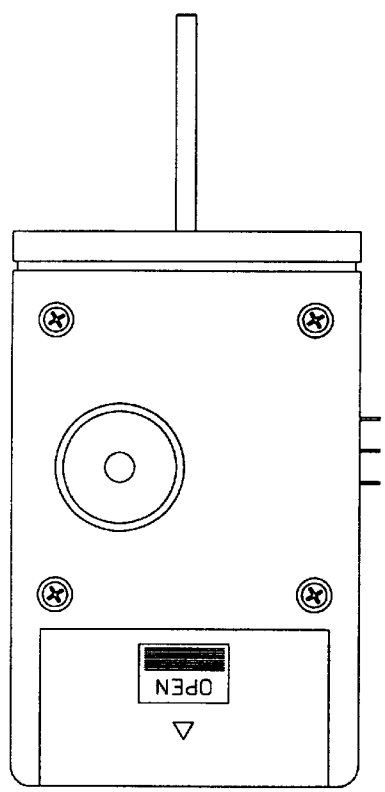
FIG. 4A is a top view of the switch and lever.
Figure 4C:
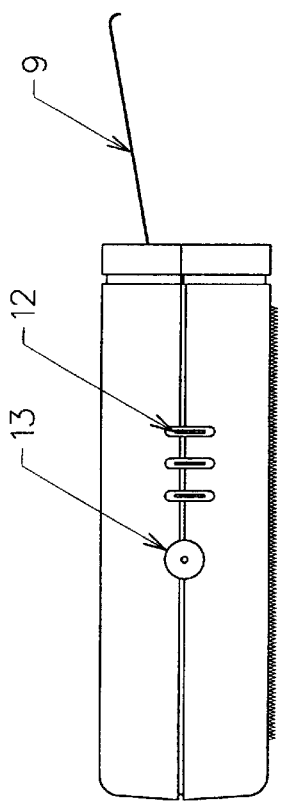
FIG. 4C is a side view of the switch and lever.

FIGS. 4A–4D show various views of the invention. The lever 9 is shown in the triggered position, i.e. unloaded (normally opened). FIG. 4C depicts the spring switch 19 integrated into the lever switch 18 in its extended position. When loaded as depicted in FIG. 3 the lever 9 is compressing the spring and switch 19 (normally closed). The Velcro (trademark) 17 located on the base of the housing allow the unit to be firmly fixed in its monitoring position. The mating base surface is also affixed with Velcro (trademark) or equivalent fastening means. The alarm system will operate satisfactory without Velcro (trademark) or other fastening devices, however it is recommended the unit be fastened to the mounting surface to avoid movement once set.

Figure 5:
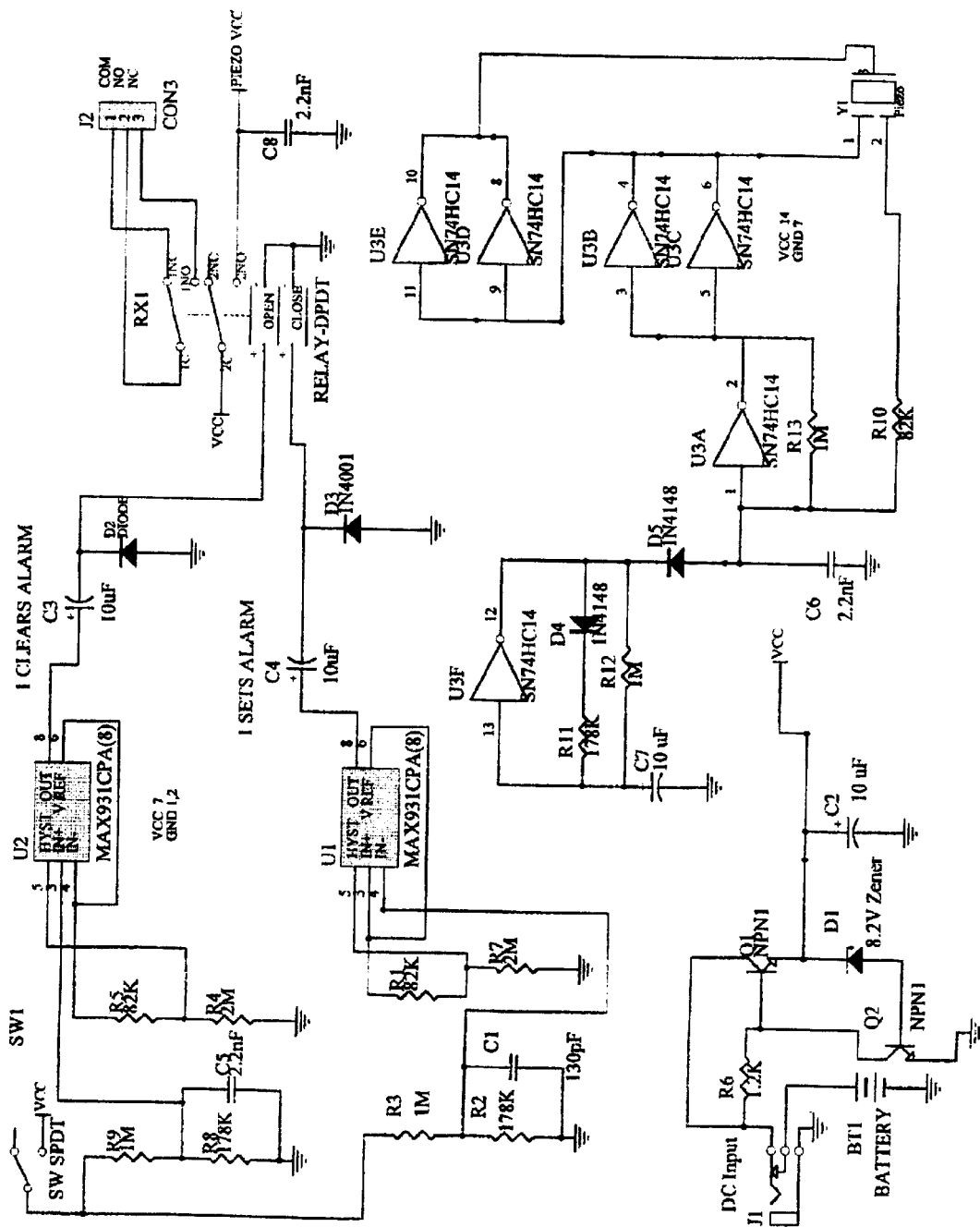
FIG. 5 is a schematic diagram of an electrical circuit of the preferred embodiment.

The electrical control circuit is shown schematically in FIG. 5. This section describes the operation of this circuit. The switch (SW1) and relay (RX1) are shown in the alarm active position. The electrical circuit uses comparators to evaluate the voltage of the battery. When the voltage of the battery drops below an adequate operating battery voltage or the float switch activation occurs, a signal is send to the relay. This relay then sets the security system contacts to indicate an alarm and also starts the alarm sequence. The detailed operation of the comparator, relay and alarm sections are described below.

The comparator circuit consists of two ultra low-power comparators (U2 and U4) and supporting voltage divider components shown to the left of these comparators. Under normal non-alarm operation, this switch has the COM terminal connected to the N/O terminal. In this normal state the U4 output is high and the U2 output is low. If either the switch is activated by raising the float or the battery level drops to less than 7.4 volts the output of U2 will go high while the U4 output will go low. These two outputs are fed to the relay. Switch SW1 is shown in the "alarm" position.

The relay circuit has capacitors to limit the steady state power drawn by the DPDT relay (RX1). The relay is shown in the alarm state. A security system may be connected to the to tabs which are directly connected to the relay. On the other side of the relay is the control of the internal alarm circuit. When in the "alarm" state the N/O terminal on pin 4 is grounded which enables the alarm sequence. If the battery fails at any time, the security contacts will indicate an alarm condition until power is resorted.

The alarm circuit consists mainly of the 555 timer (U3) and the Piezo (U1). When activated, the output of the timer goes low for approximately 1 second and high for approximately 9 seconds. The Piezo in turn preferably generates an alarm for 1 second every 10 seconds.

The electrical circuit is powered by either a standard 9-volt battery or by a wall-mounted 9 volt AC/DC adapter. When the adapter is used, the battery is taken out of the circuit.

What is claimed is:

1. A combustible liquid level alarm device for indicating the leakage of a rising combustible liquid, said device comprising:
   a housing,
   an electronic circuit within said housing, including an alarm means;
   a trigger means for detecting a rising combustible liquid level;
   said trigger means comprising:
      a lever switch within said housing;
      a lever operatively attached to said lever switch, biased towards an alarm-triggering position by a biasing means;
      a float assembly hanging from said lever, the weight of said float assembly being sufficient to downwardly overcome said upward biasing of said lever, such that said alarm means is not triggered until when and if said float assembly is elevated by said liquid rising to a height sufficient to float said float assembly; and
      a low voltage power source for said electronic circuit and alarm means to limit the heat generated by a current drawn from said power supply, thus allowing said alarm to be used for indicating the leakage of said rising combustible liquid,
   said alarm means being arranged to emit a pulsed beeping sound allowing the alarm to be differentiated from other domestic type alarms and to provide longer battery life.

2. A liquid level alarm device according to claim 1, wherein said housing has an external connection for remote alarming and/or for auxiliary control, operatively connected to said electronic circuit.

3. A liquid level alarm device according to claim 1, wherein said electronic circuit includes a power supply monitoring circuit operatively connected to said power supply for monitoring the strength of said power supply and for triggering a low power supply alarm should the power supply strength drop below a predetermined level.

4. A liquid level alarm device according to claim 1, wherein said pulsed beeping sound lasts approximately 1 second at 10 second intervals.

5. A liquid level alarm device according to claim 1, wherein the height of said float is adjustable.

6. A liquid level alarm device according to claim 1, wherein a string of adjustable length, is attached between said lever and said float assembly, to position said float assembly at a height at which said alarm is desired to be triggered.

* * * * *